C. R. HOOK.
GLASS FURNACE.
APPLICATION FILED JULY 5, 1917.
1,279,697.
Patented Sept. 24, 1918.
2 SHEETS—SHEET 1.
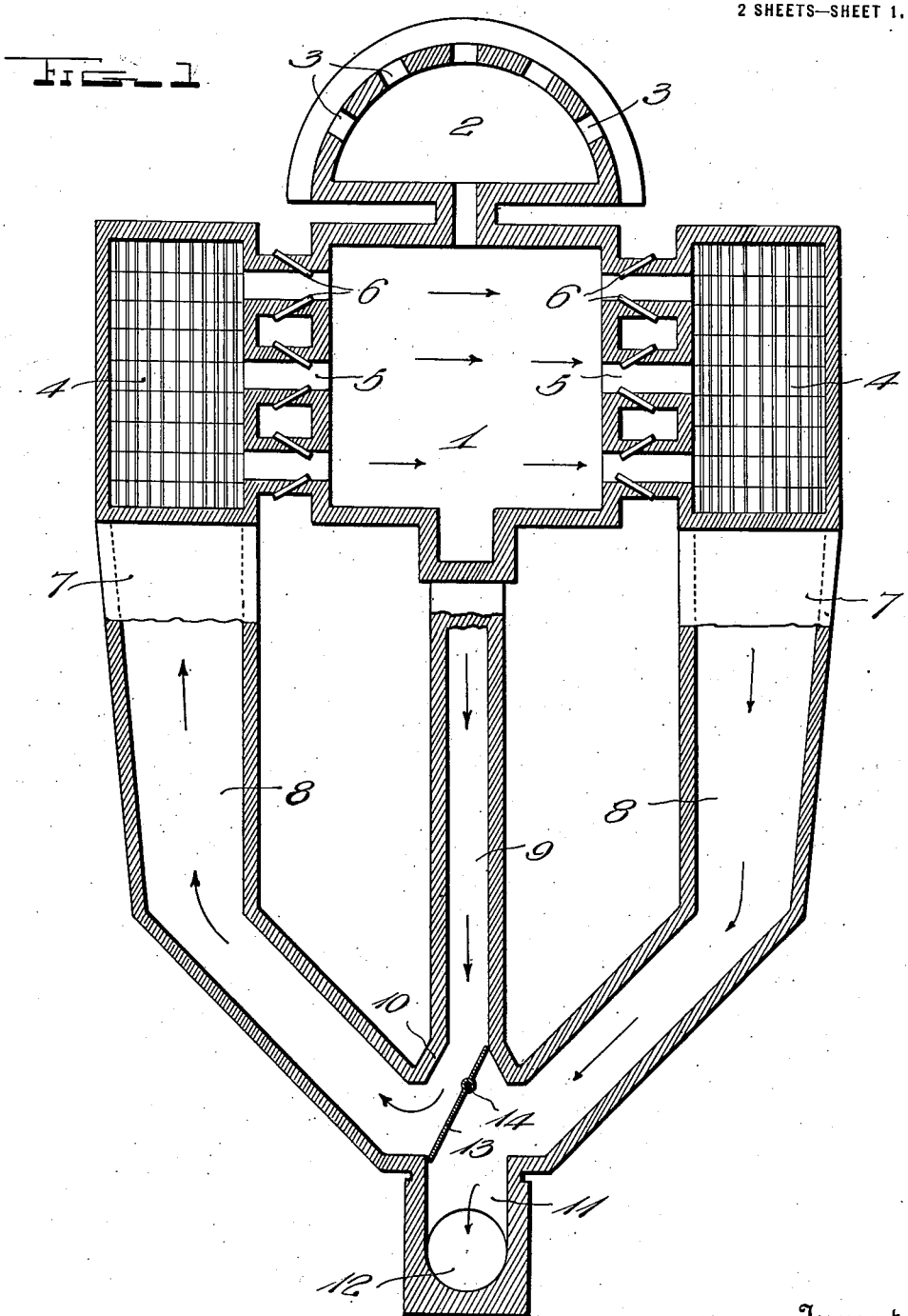
Witness
C. Cameron
Inventor
Charles R. Hook
By H. R. Williston &co
Attorneys

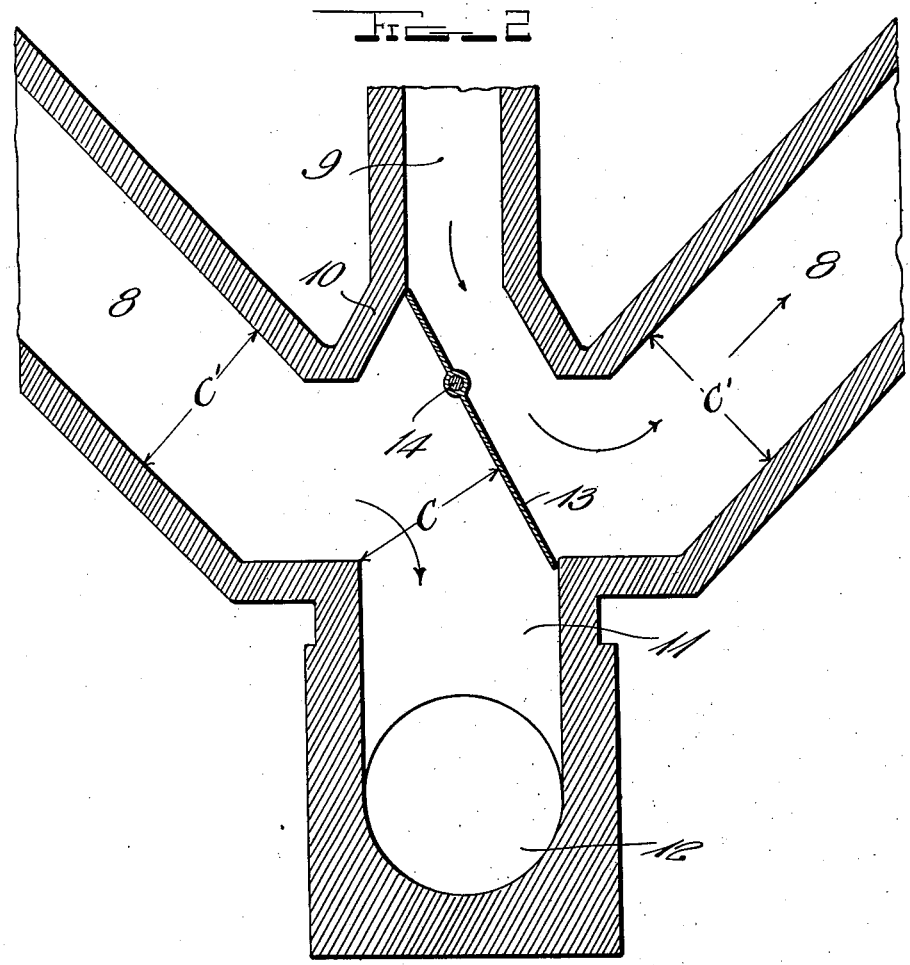
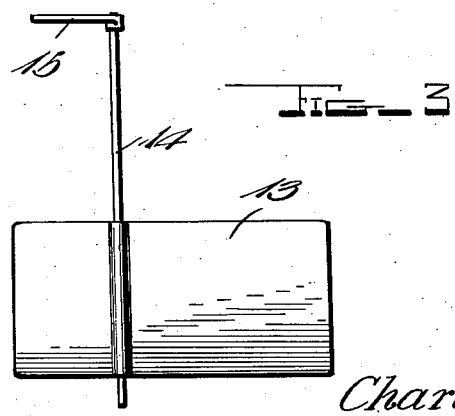

UNITED STATES PATENT OFFICE.

CHARLES R. HOOK, OF COFFEYVILLE, KANSAS.

GLASS-FURNACE.

1,279,697.  Specification of Letters Patent.  Patented Sept. 24, 1918.

Application filed July 5, 1917. Serial No. 178,770.

*To all whom it may concern:*

Be it known that I, CHARLES R. HOOK, a citizen of the United States, residing at Coffeyville, in the county of Montgomery and State of Kansas, have invented certain new and useful Improvements in Glass-Furnaces; and I do declare the following to be a full, clear, and exact description of the invention, such as will enable others skilled in the art to which it appertains to make and use the same.

My invention relates to improvements in glass furnaces of the type employing a tank in which the glass is melted and from which it is supplied to the usual working well, the latter having a plurality of ring holes from which the molten glass is taken by the blowers. Glass melting factories of this type, usually employ a pair of regenerators positioned on opposite sides of the melting tank, and a system of flues whereby the flames from the burners are alternately forced from said regenerators in opposite directions across the melting tank. In reversing the course taken by the flames and heat, a butterfly or damper has been employed, but it has been found that when this damper is reversed it causes flames to be shot from the ring holes, thus often injuring the laborers and causing not only this inconvenience but smoking of the entire furnace. It is the principal object of my invention, to improve upon the construction and arrangement of the butterfly or damper to such an extent as to prevent back firing of the flames through the ring holes.

A further object is to so construct the damper and its coacting parts, as to prevent choking of the flues to any extent whatever, whereby smoking is positively prevented.

With the foregoing general objects in view the invention resides in the novel features of construction and unique combinations of parts to be hereinafter fully described and claimed, the descriptive matter being supplemented by the accompanying drawings which form a part of this specification and in which:

Figure 1 is a top plan view of a glass melting furnace, with parts broken away and in sections, showing the application of the improved butterfly or damper;

Fig. 2 is a view similar to a portion of Fig. 1, showing the butterfly in reversed position; and Fig. 3 is a side elevation of the damper or butterfly.

In the drawings above briefly described, the numeral 1 designates the tank of a common type of glass furnace; 2 indicates the well from which the molten glass is taken by the usual blowing tubes which are inserted through ring holes 3 in the wall of said well, the numerals 4 indicate the usual regenerators which are positioned at the opposite sides of the tank 1, and at 5 are shown the port holes in which the burners 6 are positioned for heating the contents of the tank 1. As usual, tunnels 7 extend beneath the regenerators 4; the outer ends of these tunnels being shown in elevation in Fig. 1, said tunnels communicating with a pair of hot air flues 8 which converge near their outer ends and communicate with each other. A cold air passage 9 is positioned between the two hot air flues 8 and is formed with an outwardly flared outer end 10 which discharges into said flues at their point of communication, a smoke outlet passage 11 being provided from said point in alinement with the passage 9, said passage 11 leading to a suitable stack 12.

All the construction above briefly described, is old in the art but before a clear understanding of the present invention may be had, it will be well to briefly describe the operation of this type of glass furnace. To this end, we will assume that by means of the butterfly or damper 13, the right hand flue 8 of Fig. 1 has been placed in communication with the stack 12, whereas the other flue has similarly been placed in communication with the cold air passage 9. When the burners 6 are now lighted, the cold air flows from the passage 9 through the left hand passage 8, upwardly through the regenerator 4 and through the port holes 5 at the left hand side of the furnace, as the air passes through these holes, it mixes with the flames from the burners, and passes across the tank 1, through the port holes 5 at the other side of the apparatus, and then escapes through the adjacent regenerator 4 and the flue 8 leading therefrom to the stack. The furnace is operated for probably thirty minutes with the hot air currents and flame traveling as specified. At the expiration of this time, however, the butterfly 13 is reversed to the position shown in Fig. 2, with the result that the hot air currents and flame will be caused to travel in the opposite direction across the tank 1. This alternate operation, continues throughout the time the furnace is being used, and insures that the glass in the tank 1 shall be evenly melted.

The types of butterflies 13 heretofore employed, have been mounted on a vertical axis positioned at the center thereof and in line with the centers of the air passage 9 and outlet 11, but this arrangement has proven to be very inefficient, since the damper chokes down the outlet passage for the heat and smoke and causes the numerous undesirable results above set forth. In the present invention, however, the inner or rear end of the damper plate or butterfly 13 extends into the outwardly flared outer end 10 and the air passage 9, whereas the outer or front end of said plate operates across the inner end of the smoke outlet passage 11 as will be clear from Figs. 1 and 2, the axis of said damper being positioned in rear of the center thereof in the plane of the delivery end of passage 9 and still in line with the centers of this passage and the outlet 11. A vertical operating shaft 14 is permanently secured to the damper plate 13 at the axis thereof, as shown clearly in the drawings, the upper end of said shaft being provided with a suitable crank arm or the like 15 whereby it may be turned whenever required to reverse the position of the damper.

By changing the location of the axis of the butterfly, as set forth, the distance C of Fig. 2 is increased to the width C' of the flues 8 so that the outgoing smoke is not retarded, and thus no back firing or smoking takes place. This has been proven by actual use of the invention in several glass factories. On account of the several advantages resulting from the specific arrangement shown and described, such arrangement constitutes the preferred form of my improved damper and flue system. It is to be understood, however, that within the scope of the invention as claimed numerous minor changes might well be made.

I claim:

The combination with the two hot air flues leading from the regenerators at opposite sides of a glass melting tank, said flues communicating at their outer ends, an air supply passage having an outwardly flared end discharging into said flues at their point of communication, and a smoke outlet from said point in alinement with said air passage; of a vertical damper plate whose inner end extends into said flared end of the air passage and whose outer end operates across said smoke outlet, and a vertical pivot for said damper plate, whereby it may be swung to place either of said hot air flues in communication with said smoke outlet and to simultaneously place the other flue in communication with said air supply passage, said pivot being located between the center of said damper plate and the inner end thereof and being disposed in line with the centers of said air supply passage and said smoke outlet.

In testimony whereof I have hereunto set my hand in the presence of subscribing witnesses.

CHARLES R. HOOK.

Witnesses:
W. G. BOWMAN,
SAMUEL BOWMAN,
A. C. BOWMAN.